United States Patent
Ichinose et al.

(10) Patent No.: US 11,914,028 B2
(45) Date of Patent: Feb. 27, 2024

(54) OBJECT DETECTION DEVICE FOR VEHICLE

(71) Applicant: Hitachi Automotive Systems, Ltd., Hitachinaka (JP)

(72) Inventors: Masanori Ichinose, Tokyo (JP); Shigenori Hayase, Hitachinaka (JP); Akira Kuriyama, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 691 days.

(21) Appl. No.: 17/054,240

(22) PCT Filed: May 15, 2019

(86) PCT No.: PCT/JP2019/019220
§ 371 (c)(1),
(2) Date: Nov. 10, 2020

(87) PCT Pub. No.: WO2019/239775
PCT Pub. Date: Dec. 19, 2019

(65) Prior Publication Data
US 2021/0141079 A1     May 13, 2021

(30) Foreign Application Priority Data

Jun. 15, 2018    (JP) ................................ 2018-114468

(51) Int. Cl.
*G01S 13/931*     (2020.01)
*G06T 7/77*     (2017.01)
(Continued)

(52) U.S. Cl.
CPC .......... *G01S 13/931* (2013.01); *G01S 13/867* (2013.01); *G01S 13/93* (2013.01); *G06T 7/77* (2017.01);
(Continued)

(58) Field of Classification Search
CPC ...... G01S 13/931; G01S 13/867; G01S 13/93; G01S 15/86; G01S 7/497; G01S 13/08;
(Continued)

(56) References Cited

U.S. PATENT DOCUMENTS

| | | | |
|---|---|---|---|
| 10,551,509 B2 * | 2/2020 | Song | G01C 21/3602 |
| 2009/0122136 A1 * | 5/2009 | Shiraishi | G08G 1/167 |
| | | | 348/135 |
| 2017/0201736 A1 | 7/2017 | Ishimaru | |

FOREIGN PATENT DOCUMENTS

| | | |
|---|---|---|
| JP | H04-155211 A | 5/1992 |
| JP | H06-230115 A | 8/1994 |

(Continued)

OTHER PUBLICATIONS

International Search Report with English translation and Written Opinion issued in corresponding application No. PCT/JP2019/019220 dated Jul. 9, 2019.

*Primary Examiner* — Christopher M Brandt
(74) *Attorney, Agent, or Firm* — Foley & Lardner LLP

(57) ABSTRACT

The present invention provides a object detection device for vehicle capable of performing distance measurement more reliably than in the past and having high compatibility for distance measurement. The present invention provides an object detection device 100 for vehicle including a first detection unit 10, a second detection unit 20, an error quantity calculation unit 30, a correction quantity calculation unit 40, and a distance correction unit 50. The error quantity calculation unit 30 compares the distances D1 and D1' of the same object detected by the first detection unit 10 and the second detection unit 20 to calculate the error quantity ΔD. The correction quantity calculation unit 40 calculates the correction quantity $CA_t$ based on the error quantity ΔD. The distance correction unit 50 corrects the (Continued)

distances D1' and D2' of the object detected by the second detection unit 20 based on the correction quantity $CA_r$.

10 Claims, 6 Drawing Sheets

(51) Int. Cl.
*G01S 13/86* (2006.01)
*G01S 13/93* (2020.01)
*G06V 20/58* (2022.01)

(52) U.S. Cl.
CPC .... *G06V 20/58* (2022.01); *G06T 2207/30261* (2013.01)

(58) Field of Classification Search
CPC ........... G01S 15/931; G01S 2013/9323; G01S 13/865; G01S 17/931; G06T 7/77; G06T 2207/30261; G06V 20/58
See application file for complete search history.

(56) References Cited

FOREIGN PATENT DOCUMENTS

| | | |
|---|---|---|
| JP | 2004-028727 A | 1/2004 |
| JP | 2004-347471 A | 12/2004 |
| JP | 2007-024590 A | 2/2007 |
| JP | 2010-091426 A | 4/2010 |
| JP | 2016-008847 A | 1/2016 |
| JP | 2017-040549 A | 2/2017 |

* cited by examiner

OBJECT DETECTION DEVICE FOR VEHICLE

TECHNICAL FIELD

The present disclosure relates to an object detection device for vehicle.

BACKGROUND ART

An invention relating to a distance measuring method of measuring a distance by recognizing a specific object in a three-dimensional space is known in the related art (see PTL 1 below). In the distance measuring method disclosed in PTL 1, one or a plurality of image capturing means, image processing means, and laser distance measuring means are provided, and a specific point in a three-dimensional space is measured at a high speed with high accuracy (see Claim 1 in PTL 1).

The image capturing means captures an image of a target range within the field of view and outputs image data. The image processing means performs image processing on the image data obtained from the image capturing means and extracts feature points to be noticed. The laser distance measuring means has a mechanism capable of controlling the movement of a laser beam vertically and horizontally, and measures the distance to the feature point by aligning the target with the feature point obtained from the image processing means.

According to the invention in the related art, a specific point (specific area) to be noticed is recognized and extracted by image processing on an image captured by a TV camera, and laser distance measurement is performed for the specific point. Thus, it is possible to perform recognition of a target and distance measurement to the target at a high speed with high accuracy, and, for example, it can be applied to a visual system for autonomous driving, by immediately determining an obstacle on a road and the distance to the obstacle (see "Advantageous Effects of Invention" and the like on page 5 in PTL 1).

CITATION LIST

Patent Literature

PTL 1: JP 4-155211 A

SUMMARY OF INVENTION

Technical Problem

In the distance measuring method according to the above-described invention in the related art, the feature point is extracted by the image capturing means, and the distance to the feature point is measured by the laser distance measuring means. In this method, the distance is not measured by the image capturing means, but by the laser distance measuring means. Therefore, there are problems that it is difficult to measure a distance in an object, an environment, or a range that is not suitable for laser distance measurement, and compatibility for distance measurement is low.

The present disclosure provides an object detection device for vehicle capable of performing distance measurement more reliably than in the past and having high compatibility for distance measurement.

Solution to Problem

According to an aspect of the present disclosure, an object detection device for vehicle that detects a distance of an object around a vehicle includes a first detection unit that detects a distance of an object in a first detection range, a second detection unit that detects a distance of an object in a second detection range including at least a portion of the first detection range, an error quantity calculation unit that compares the distances of the same object detected by the first detection unit and the second detection unit to calculate an error quantity, a correction quantity calculation unit that calculates a correction quantity for correcting the distance of the object detected by the second detection unit based on the error quantity, and a distance correction unit that corrects the distance of the object detected by the second detection unit based on the correction quantity.

Advantageous Effects of Invention

According to the aspect of the present disclosure, it is possible to provide an object detection device for vehicle capable of performing distance measurement more reliably than in the past and having high compatibility for distance measurement.

DESCRIPTION OF EMBODIMENTS

Hereinafter, an object detection device for vehicle according to embodiments of the present disclosure will be described with reference to the drawings.

Embodiment 1

Figure 1:
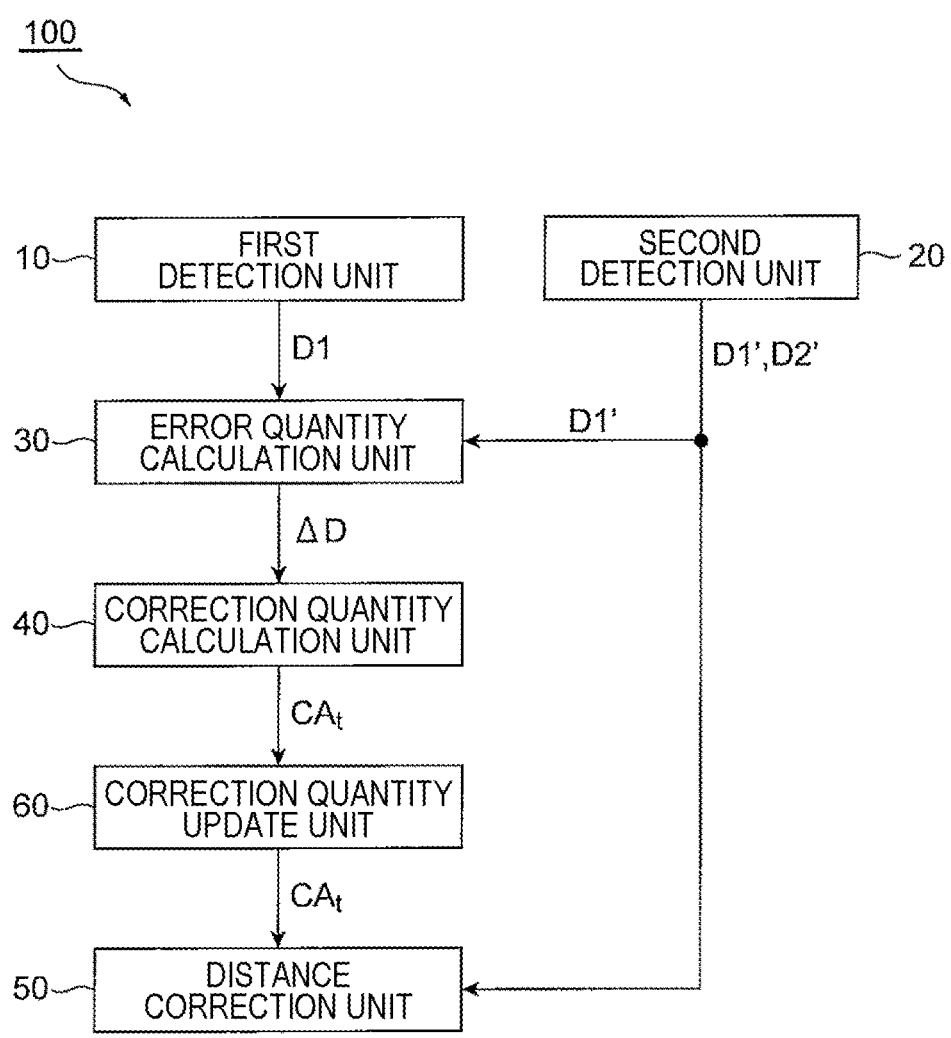
FIG. 1 is a block diagram illustrating an object detection device for vehicle according to Embodiment 1.
Figure 2:
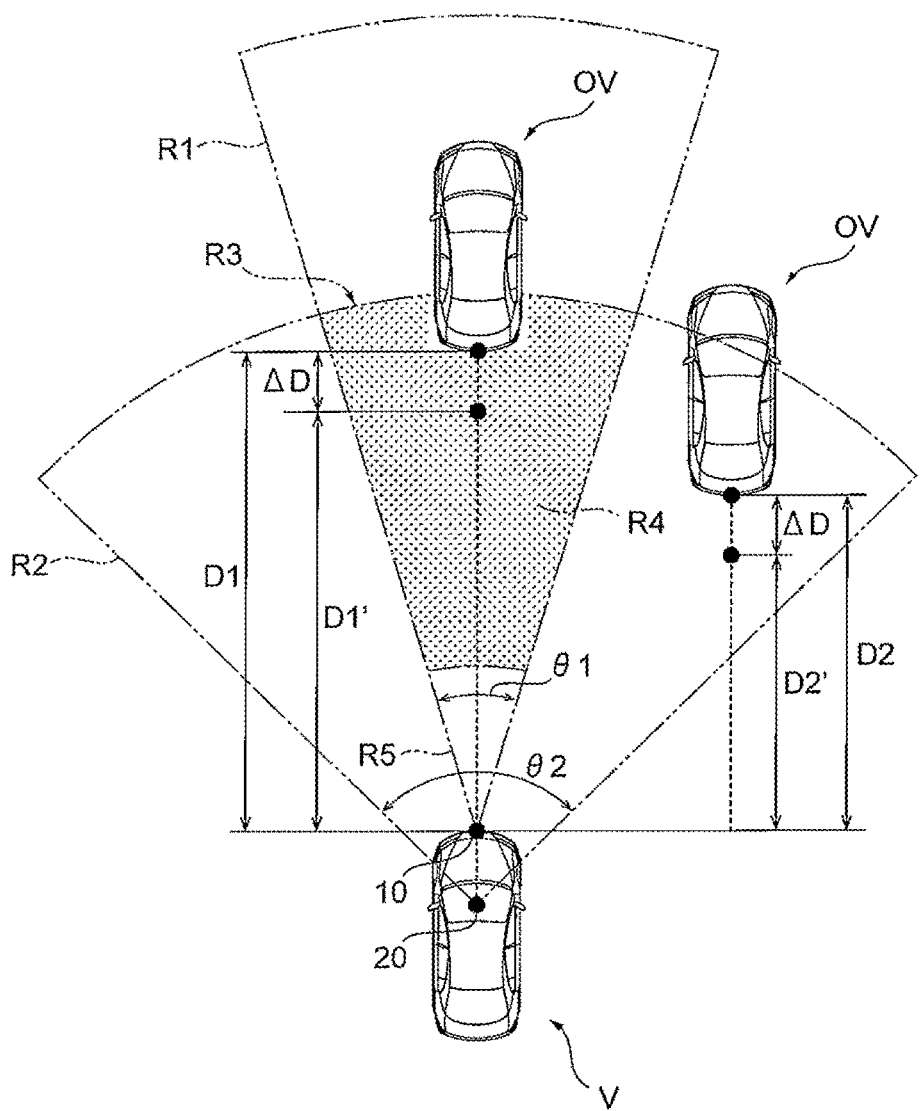
FIG. 2 is a plan view illustrating an example of detection ranges of a first detection unit and a second detection unit illustrated in FIG. 1.

FIG. 1 is a block diagram illustrating an object detection device 100 for vehicle according to Embodiment 1. FIG. 2 is a plan view illustrating an example of detection ranges of a first detection unit 10 and a second detection unit 20 in the object detection device 100 for vehicle illustrated in FIG. 1. Although details will be described later, the object detection device 100 for vehicle according to the present embodiment has a configuration as follows, as the main features.

The object detection device 100 for vehicle is a device, for example, that is mounted in a vehicle V such as an automobile and detects the distance between the vehicle V and an object around the vehicle V. The object detection device for vehicle includes the first detection unit 10, the second detection unit 20, an error quantity calculation unit 30, a correction quantity calculation unit 40, and a distance correction unit 50. The first detection unit 10 is configured to detect the distance D1 of an object in a first detection range R1. The second detection unit 20 is configured to detect the distances D1 and D2 of an object in a second detection range R2 including at least a portion of the first detection range R1. The error quantity calculation unit 30 is configured to compare the distances D1 and D1' of the same object detected by the first detection unit 10 and the second detection unit 20 to calculate the error quantity ΔD. The correction quantity calculation unit 40 is configured to calculate the correction quantity $CA_r$ for correcting the distance D1' of the object detected by the second detection unit 20 based on the error quantity ΔD. The distance correction unit 50 is configured to correct the distances D1' and D2' of the object detected by the second detection unit 20 based on the correction quantity $CA_r$.

The configuration of the object detection device 100 for vehicle according to the present embodiment will be described below in more detail. The object detection device 100 for vehicle further includes, for example, a correction quantity update unit 60 in addition to the first detection unit 10, the second detection unit 20, the error quantity calculation unit 30, the correction quantity calculation unit 40, and the distance correction unit 50 described above. The error quantity calculation unit 30, the correction quantity calculation unit 40, the distance correction unit 50, and the correction quantity update unit are configured, for example, by a portion of an electronic control unit (ECU) relating to advanced driver assistance systems (ADAS) of the vehicle V.

The first detection unit 10 is, for example, a millimeter wave sensor. The first detection unit constitutes a radar system capable of transmitting an electromagnetic signal, receiving a signal reflected by an object on a route, and determining the distance, the speed, and the angle of the object. Here, the millimeter wave is, for example, a radio wave having a frequency of 30 GHz to 300 GHz and a wavelength of 1 mm to 1 cm. In the example illustrated in FIG. 2, the first detection unit 10 is provided to detect the distance of an object in front of the vehicle V.

The object detection device 100 for vehicle may include a plurality of first detection units 10 that detect the distance of an object in the rear of the vehicle V or an object on the side of the vehicle V. In addition, the first detection unit 10 is not limited to the millimeter wave sensor, and may be, for example, a single-lens camera or an ultrasonic sensor. Further, objects detected by the first detection unit 10 include other vehicles OV around the vehicle pedestrians, obstacles, buildings, guardrails, signs, telephone poles, signals, and the like.

The second detection unit 20 includes, for example, a single or a plurality of image capturing units, and detects the distance of an object based on the image of the object captured by the image capturing unit. That is, the image capturing unit is, for example, a single-lens camera or a stereo camera for distance measurement. The second detection unit 20 detects the distance of an object, for example, based on the image of the object captured by a single-lens camera equipped with a filter for acquiring a distance image. Further, the second detection unit 20 detects the distance of an object, for example, by trigonometry based on a plurality of images of the object captured by the stereo camera.

When the second detection unit 20 includes the image capturing unit, the second detection unit 20 may be configured to detect not only the distances D1' and D2' of an object but also the characteristics such as the position, the shape, the size, and the color of the object.

The object detection device 100 for vehicle may include a plurality of second detection units 20 that detect the distance of an object in the rear of the vehicle V or an object on the side of the vehicle V. In addition, the second detection unit 20 is not limited to the configuration including the image capturing unit, and may be, for example, laser imaging detection and ranging (LIDAR). The LIDAR is a device that measures scattered light in response to irradiation with light emitted in a pulse and analyzes distance to an object and the property of the object.

In the object detection device 100 for vehicle according to the present embodiment, the detection accuracy of the distance D1 by the first detection unit 10 is higher than the detection accuracy of the distance D1' by the second detection unit 20, for example. More specifically, for example, it is assumed that the first detection unit 10 is a millimeter wave sensor and the second detection unit is a stereo camera. In this case, the detection accuracy of the distance D1 of the first detection unit 10 of the TOF (Time Of Flight) method using millimeter waves tends to be higher than the detection accuracy of the distance D1' of the second detection unit 20 based on the parallax of the stereo camera.

Further, in the object detection device 100 for vehicle according to the present embodiment, a viewing angle θ1 of the first detection unit 10, that is, an angular range in which detecting the distance of the object is possible is narrower than a viewing angle θ2 of the second detection unit 20, that is, an angular range in which detection the distance of the object is possible. Further, in the object detection device 100 for vehicle according to the present embodiment, the first detection unit 10 can detect the distance of an object farther than the second detection unit 20, for example. In addition, in the object detection device 100 for vehicle according to the present embodiment, the second detection range R2 in the second detection unit 20 includes a portion of the first detection range R1 in the first detection unit 10. The second detection range R2 in the second detection unit 20 may include the entirety of the first detection range R1 in the first detection unit 10.

As described above, the error quantity calculation unit 30 compares the distances D1 and D1' of the same object (for example, another vehicle OV) detected by the first detection unit 10 and the second detection unit 20 to calculate the error quantity ΔD. Here, the error quantity ΔD calculated by the error quantity calculation unit 30 is not particularly limited. For example, the error quantity ΔD is a difference between the distance D1 of the front vehicle CV detected by the first detection unit 10 and the distance D1' of the same vehicle CV detected by the second detection unit 20. In addition, the error quantity ΔD may be a ratio D1/D1' between the distance D1 and the distance D1'. That is, the error quantity calculation unit 30 can calculate the ratio D1/D1' between the distances D1 and D1' of the same object detected by the first detection unit 10 and the second detection unit 20, as the error quantity ΔD.

As described above, the correction quantity calculation unit 40 is configured to calculate the correction quantity $CA_r$ for correcting the distance D1' of the object detected by the second detection unit 20 based on the error quantity ΔD. For example, it is assumed that the error quantity calculation unit 30 calculates the difference (D1−D1') between the distance D1 of the front vehicle CV detected by the first detection unit 10 and the distance D1' of the same vehicle CV detected by the second detection unit 20, as the error quantity ΔD. In this case, the correction quantity calculation unit 40 calculates the error quantity ΔD=D1−D1' as the correction quantity $CA_r$. Further, for example, when the error quantity calculation unit 30 calculates the ratio D1/D1' between the distance D1 and the distance D1', as the error quantity ΔD, the correction quantity calculation unit 40 calculates the error quantity ΔD=D1/D1' as the correction quantity $CA_t$.

In addition, the object detection device 100 for vehicle in the present embodiment includes the correction quantity update unit 60 as described above. The correction quantity update unit 60 stores and updates the correction quantity $CA_t$ calculated by the correction quantity calculation unit 40. The correction quantity update unit 60 includes a storage device such as a hard disk or a memory, and can be configured to update the correction quantity $CA_t$ stored in the storage device by a small amount for each predetermined cycle.

More specifically, the correction quantity update unit 60 calculates, for example, a difference $\Delta CA = CA_t - CA_{t-n}$ between the correction quantity $CA_{t-n}$ updated and stored in the previous process at the time (t-n) and the correction quantity $CA_t$ stored in the latest process at the time t. Further, the correction quantity update unit 60 updates and stores the correction quantity $CA_t$ at the time t based on the following expression (1), for example. In the following expression (1), N is an update gain and is 1 or more.

$$CA_t = CA_{t-n} + \Delta CA/N \quad (1)$$

As described above, the distance correction unit 50 corrects the distances D1' and D2' of the object detected by the second detection unit 20 based on the correction quantity $CA_t$. As described above, when the object detection device 100 for vehicle includes the correction quantity update unit 60, the distance correction unit 50 corrects the distance D1' of the object based on the correction quantity $CA_t$ stored in the correction quantity update unit 60. When the object detection device 100 for vehicle does not include the correction quantity update unit 60, the distance correction unit 50 may correct the distance D1' of the object based on the correction quantity $CA_t$ calculated by the correction quantity calculation unit 40.

Figure 3:
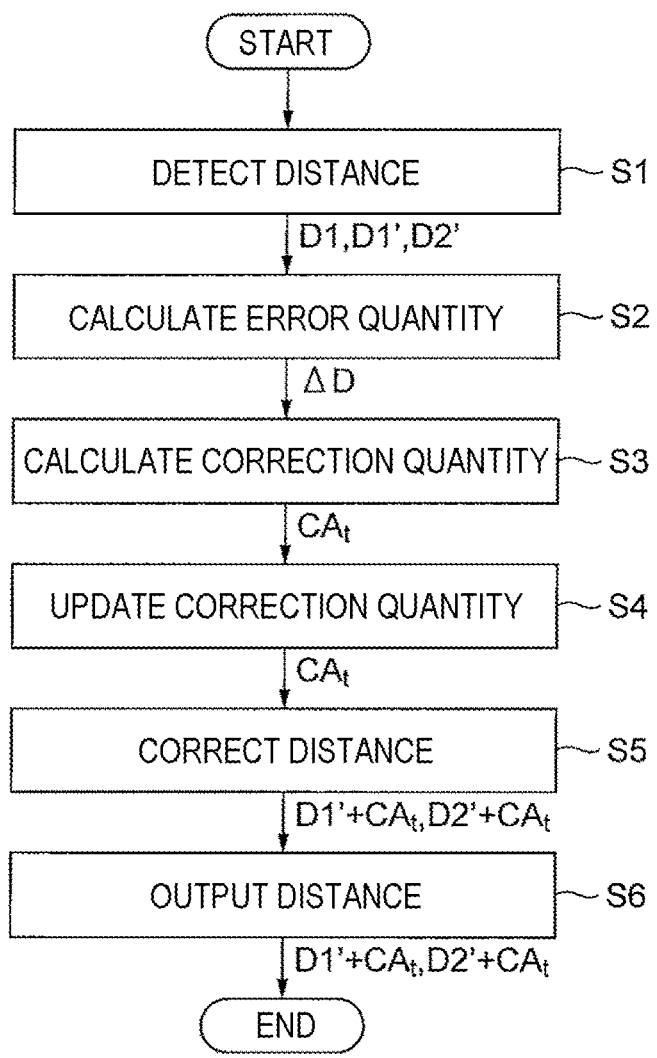
FIG. 3 is a flowchart illustrating an example of a process by the object detection device for vehicle illustrated in FIG. 1.

Next, an operation of the object detection device 100 for vehicle in the present embodiment will be described. FIG. 3 is a flowchart illustrating an example of a process of measuring the distance of an object by the object detection device 100 for vehicle in the present embodiment. In the object detection device 100 for vehicle, a series of processes from a distance detection process S1 to a distance output process S6 illustrated in FIG. 3 are repeatedly executed in a predetermined cycle, for example.

For example, as illustrated in FIG. 2, it is assumed that two other vehicles OV are in front of a vehicle V in which the object detection device 100 for vehicle is mounted. The first vehicle OV in front of the vehicle V is located, for example, in an overlapping region R3 in which the first detection range R1 of the first detection unit 10 and the second detection range R2 of the second detection unit 20 overlap each other. The second vehicle OV is located only in the second detection range R2 of the second detection unit 20.

In such a situation, the object detection device 100 for vehicle firstly executes the distance detection process S1. In the distance detection process S1, the first detection unit 10 and the second detection unit 20 detect the distances D1 and D1' of the first vehicle OV being the same object in the overlapping region R3. Only the second detection unit 20 detects the distance D2' of the second vehicle OV in the second detection range R2.

Then, the object detection device 100 for vehicle executes an error quantity calculation process S2. In the error quantity calculation process S2, the error quantity calculation unit 30 compares the distances D1 and D1' of the same object detected by the first detection unit 10 and the second detection unit 20 to calculate the error quantity ΔD. Here, the error quantity calculation unit 30 calculates, for example, the ratio D1/D1' between the distance D1 and the distance D1', as the error quantity ΔD.

Here, in the object detection device 100 for vehicle in the present embodiment, as described above, for example, the detection accuracy of the distance D1 by the first detection unit 10 is higher than the detection accuracy of the distance D1' by the second detection unit 20. More specifically, for example, the first detection unit 10 is a millimeter wave sensor, and the second detection unit 20 is configured by a stereo camera. As described above, the millimeter wave sensor measures the distance D1 based on the TOF of the millimeter wave, and the stereo camera measures the distance D1' based on the parallax between images captured by the left and right cameras.

In general, distance measurement based on millimeter-wave TOF has more accuracy than distance measurement using the image capturing unit. In addition, in the first detection unit 10 which is a millimeter wave sensor, for example, the detection accuracy of the detected distance D1 of an object has difficult in decreasing with time. On the other hand, in the distance measurement using the image capturing unit, for example, the detection accuracy of the distances D1' and D2' of an object in the second detection unit 20 depends on the accuracy of the mounting position of the image capturing unit. Further, for example, the mounting position of the image capturing unit changes with time by the influence of vibration, an inertial force, and thermal stress acting on the image capturing unit. Thus, the detection accuracy of the distances D1' and D2' of an object in the second detection unit 20 may decrease.

Then, the object detection device 100 for vehicle executes a correction quantity calculation process S3. In the correction quantity calculation process S3, the correction quantity calculation unit 40 calculates the correction quantity $CA_t$ for correcting the distance D1' of the object detected by the second detection unit 20, based on the error quantity ΔD. Here, the correction quantity calculation unit 40 calculates, for example, the ratio D1/D1' between the distance D1 and the distance D1', as the error quantity ΔD calculated by the error quantity calculation unit 30 in the latest process, as the correction quantity $CA_t$ in the latest process.

Then, when the object detection device 100 for vehicle includes the correction quantity update unit 60, a correction quantity update process S4 is executed. In the correction quantity update process S4, the correction quantity update unit 60 stores the correction quantity $CA_t$ in the latest process, which is calculated by the correction quantity calculation unit 40. Further, the correction quantity update unit 60 updates the correction quantity $CA_{t-n}$ updated and stored in the process at the previous time (t-n) to the correction quantity $CA_t$ in the latest process at the time t.

For example, as described above, when the correction quantity update unit 60 is configured to update the correction quantity $CA_t$ by a small amount for each predetermined cycle, the correction quantity update unit 60 executes the following processes, for example. Firstly, the correction quantity update unit 60 calculates the difference $\Delta CA = CA_t - CA_{t-1}$ between the correction quantity $CA_{t-1}$ updated and stored in the previous process at the time (t-1) and the correction quantity $CA_t$ stored in the latest process at the time t. Further, the correction quantity update unit 60 sets a value obtained by adding a value (obtained by dividing the difference $\Delta CA = CA_t - CA_{t-1}$ by an update again N) to the previous correction quantity $CA_{t-1}$, as the latest correction quantity $CA_t$, based on the above expression (1). Then, the correction quantity update unit updates the previous correction quantity $CA_{t-1}$ to the latest correction quantity $CA_t$ and stores the updated quantity.

As described above, it is possible to gradually bring the latest correction quantity $CA_t$ closer to the correction value by adding the value (obtained by dividing the difference $\Delta CA$ between the correction quantity $CA_{t-1}$ and the latest correction quantity $CA_t$ by the update gain N) to the previous correction quantity $CA_{t-1}$ stored in the correction quantity update unit 60. Thus, for example, even though the latest correction quantity $CA_t$ calculated by the correction quantity calculation unit 40 suddenly becomes extremely large due to an accidental disturbance, it is possible to greatly reduce the influence of disturbance on the latest correction quantity $CA_t$ updated and stored in the correction quantity update unit 60.

Then, the object detection device 100 for vehicle executes a distance correction process S5. In the distance correction process S5, the distance correction unit 50 corrects the distances D1' and D2' of the object detected by the second detection unit 20 based on the correction quantity $CA_t$ updated and stored in the correction quantity update unit 60. More specifically, the distance correction unit 50 corrects the distance D1' by adding the correction quantity $CA_t$ to the distance D1' of the first vehicle OV detected by the second detection unit 20.

In addition, the distance correction unit 50 corrects the distance D2' by adding the correction quantity $CA_t$ to the distance D2' of the second vehicle OV detected by the second detection unit 20. When the object detection device 100 for vehicle does not include the correction quantity update unit 60, the distance correction unit 50 may correct the distances D1' and D2' of the object detected by the second detection unit 20 based on the latest correction quantity $CA_t$ calculated by the correction quantity calculation unit 40.

The object detection device 100 for vehicle finally executes a distance output process S6. In the distance output process S6, the distance correction unit 50 outputs the distances D1' and D2' of the object, which are detected by the second detection unit 20 and corrected by the distance correction unit 50. More specifically, the distance (D1'+$CA_t$) of the first vehicle OV, which is detected by the second detection unit 20 and corrected by the distance correction unit 50 is output from the distance correction unit 50. In addition, the distance (D2'+$CA_t$) of the second vehicle OV, which is detected by the second detection unit 20 and corrected by the distance correction unit 50 is output from the distance correction unit 50.

As described above, the object detection device 100 for vehicle in the present embodiment is the device that detects the distance between the vehicle V and an object around the vehicle V. The object detection device for vehicle includes the first detection unit 10, the second detection unit 20, the error quantity calculation unit 30, the correction quantity calculation unit 40, and the distance correction unit 50. The first detection unit 10 detects the distance D1 of an object in the first detection range R1. The second detection unit 20 detects the distances D1' and D2' of an object in the second detection range R2 including at least the portion of the first detection range R1. The error quantity calculation unit 30 compares the distances D1 and D1' of the same object detected by the first detection unit 10 and the second detection unit 20 to calculate the error quantity $\Delta D$. The correction quantity calculation unit 40 calculates the correction quantity $CA_t$ for correcting the distance D1' of the object detected by the second detection unit 20 based on the error quantity $\Delta D$. The distance correction unit 50 corrects the distances D1' and D2' of the object detected by the second detection unit 20, based on the correction quantity $CA_t$.

With this configuration, the second detection unit 20 can detect not only the distance D1' of an object in the overlapping region R3 but also the distance D2' of an object only in the second detection range R2.

The second detection unit 20 can correct the distances D1' and D2' of the object detected by the second detection unit 20, to distances (D1'+$CA_t$) and (D2'+$CA_t$) which are more accurate and closer to the actual distance of the object. Thus, even though there is a temporal error in the distances D1' and D2' of the object detected by the second detection unit 20, the second detection unit 20 can accurately measure the distance of the object. Therefore, according to the present embodiment, it is possible to provide the object detection device 100 for vehicle capable of performing distance measurement more reliably than the technology in the related art.

In addition, the first detection unit 10 and the second detection unit 20 can detect the accurate distances D1 and (D1'+$CA_t$) of the object in the overlapping region R3 in which the first detection range R1 of the first detection unit 10 and the second detection range R2 of the second detection unit 20 overlap each other. Thus, it is possible to complement the weaknesses of the first detection unit 10 and the second detection unit 20 with each other, and to provide the object detection device 100 for vehicle having higher compatibility for distance measurement than the technology in the related art.

In addition, the first detection unit 10 and the second detection unit 20 can measure the accurate distances D1 and (D1'+$CA_t$) of the same object in the overlapping region R3. Thus, it is easy to perform grouping for identifying the same object detected by the first detection unit 10 and the second detection unit 20. Therefore, in the object detection device 100 for vehicle, it is possible to facilitate sensor fusion of integrating information from a plurality of sensors.

In addition, in the object detection device 100 for vehicle in the present embodiment, the detection accuracy of the distance D1 by the first detection unit 10 is higher than the detection accuracy of the distance D1' by the second detection unit 20. Thus, it is possible to calculate the error quantity $\Delta D$ and the correction quantity $CA_t$ of the distance D1' detected by the second detection unit 20, based on the distance D1 detected by the first detection unit 10.

In addition, the object detection device 100 for vehicle in the present embodiment includes the correction quantity update unit 60 that stores and updates the correction quantity $CA_t$. The distance correction unit 50 corrects the distances D1' and D2' of the object based on the correction quantity $CA_t$ stored in the correction quantity update unit 60. Thus, as described above, the correction quantity update unit 60 can update the correction quantity $CA_t$ by a small amount every predetermined period. Therefore, it is possible to gradually adjust the distance D1' to the distance D1 detected as a reference by the first detection unit 10 while utilizing the distance D1' detected by the second detection unit 20 in the latest process. As a result, it is possible to effectively use the detection results of the first detection unit 10 and the second detection unit 20 while reducing the steady error of the second detection unit 20.

Further, in the object detection device 100 for vehicle in the present embodiment, the error quantity calculation unit 30 calculates the ratio D1/D1 between the distances D1 and D1' of the same object detected by the first detection unit 10 and the second detection unit 20, as the error quantity ΔD. Accordingly, it is possible to easily calculate the error quantity ΔD of the distance D1' detected by the second detection unit 20 with respect to the distance D1 detected by the first detection unit 10.

In addition, in the object detection device 100 for vehicle in the present embodiment, the second detection unit 20 includes one or the plurality of image capturing units, and detects the distance of the object based on the image of the object captured by the image capturing unit. With this configuration, the second detection unit 20 can detect not only the distance of the object, but also the characteristics such as the color and the shape of the object. According to the above configuration, it is possible to correct a temporal error that has occurred in the image capturing unit of the second detection unit 20, and to achieve both image acquisition and accurate object distance measurement in the second detection unit 20.

As described above, according to the present embodiment, it is possible to provide the object detection device 100 for vehicle capable of performing distance measurement more reliably than in the past and having high compatibility for distance measurement. The object detection device for vehicle according to the present disclosure is not limited to the configuration of the object detection device 100 for vehicle according to the present embodiment. A modification example of the object detection device 100 for vehicle in the present embodiment will be described below.

Figure 4:
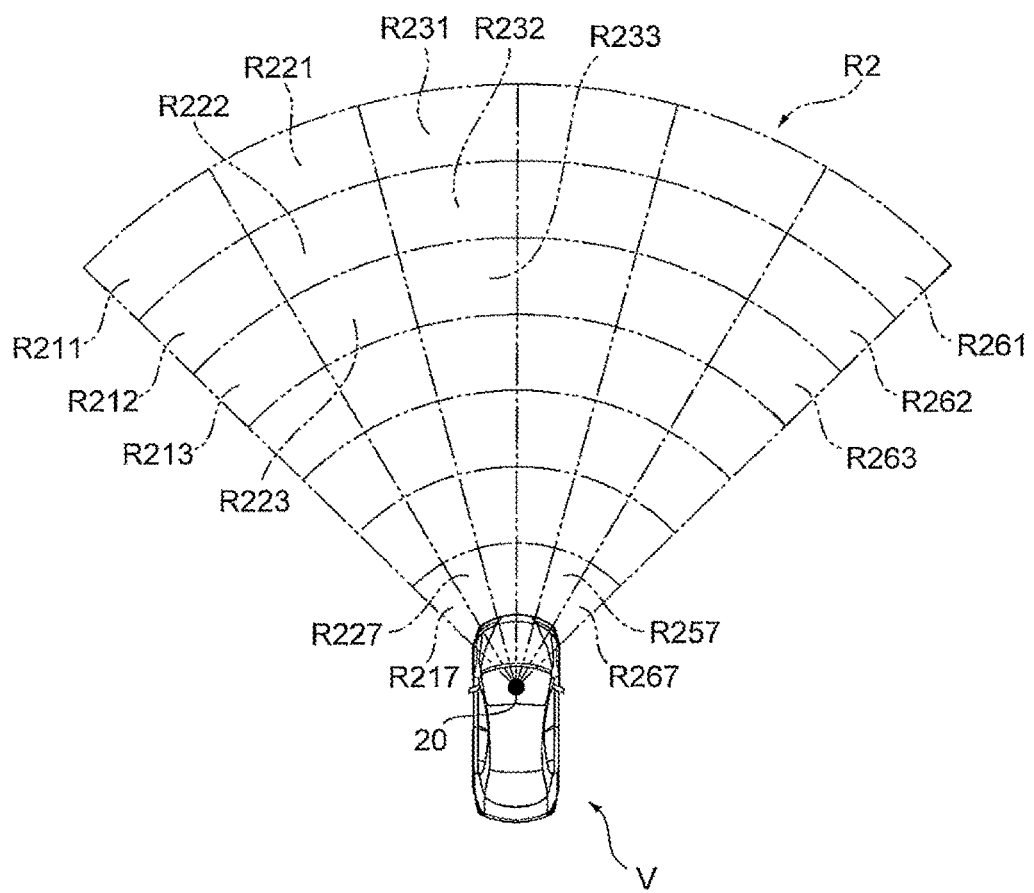
FIG. 4 is a plan view illustrating a second detection range according to a modification example of the object detection device for vehicle illustrated in FIG. 1.

FIG. 4 is a plan view illustrating the second detection range R2 according to a modification example of the object detection device 100 for vehicle illustrated in FIG. 1. In the object detection device 100 for vehicle according to the modification example illustrated in FIG. 4, the correction quantity update unit 60 is configured to update and store a plurality of correction quantities $CA_t$ depending on each position from a position R211 to a position R267 in the second detection range R2 by the second detection unit 20, for example. Further, the distance correction unit 50 is configured to correct the distance of the object detected by the second detection unit 20, based on the correction quantity $CA_t$ depending on the position.

In other words, the correction quantity update unit 60 includes a table of a plurality of correction quantities $CA_t$ set for each position in the second detection range R2. The distance correction unit 50 is configured to correct the distance of the object detected by the second detection unit 20 based on the table of the correction quantity $CA_t$. With this configuration, it is possible to correct, for example, an error of the second detection unit 20, that varies depending on the position in the second detection range R2, for example, an error caused by distortion of the lens in the image capturing unit that constitutes the second detection unit 20, by the correction quantity $CA_t$ depending on the position in the second detection range R2.

Further, in the error quantity calculation process S2, the correction quantity calculation process S3, and the correction quantity update process S4 described above, when the update process of the correction quantity $CA_t$ is performed, the position of the object among positions from the position R211 to the position R267 in the second detection range R2 is specified. Then, the correction quantity $CA_t$ corresponding to the specified position is updated and stored. Thus, even when the detection error in the distance of the second detection unit 20 does not uniformly occur in the entire second detection range R2, it is possible to update the correction quantity $CA_t$ depending on the position in the second detection range R2.

Embodiment 2

Figure 5:
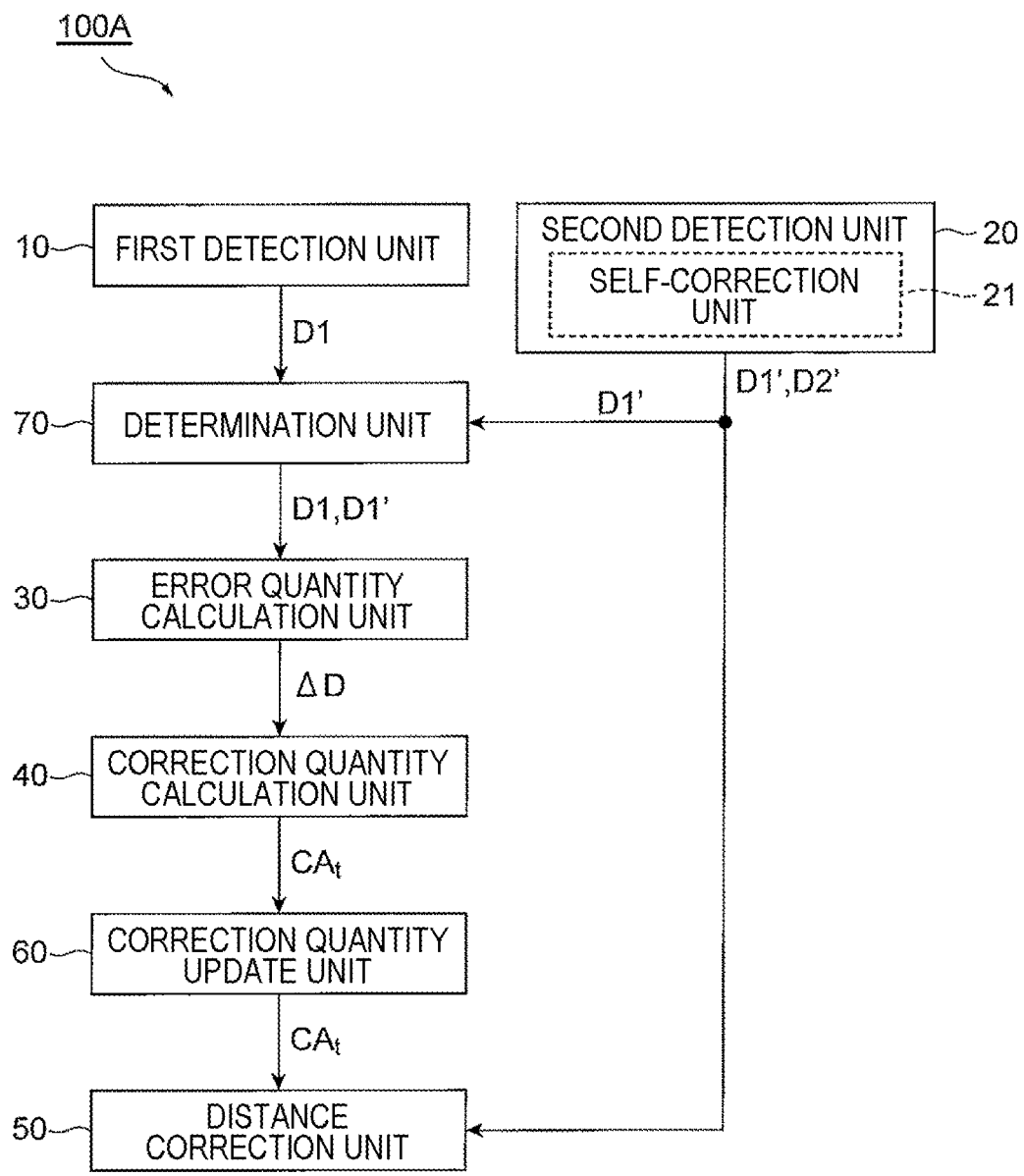
FIG. 5 is a block diagram illustrating an object detection device for vehicle according to Embodiment 2.

Next, an object detection device for vehicle according to Embodiment 2 of the present disclosure will be described. FIG. 5 is a block diagram illustrating an object detection device 100A for vehicle according to Embodiment 2.

The object detection device 100A for vehicle in the present embodiment mainly differs from the object detection device 100 for vehicle in Embodiment 1 described above in that a determination unit 70 is included. Other points of the object detection device 100A for vehicle in the present embodiment are the same as those in the object detection device 100 for vehicle in Embodiment 1 described above. Thus, the similar components are denoted by the same reference signs and description thereof will not be repeated.

In the object detection device 100A for vehicle in the present embodiment, the determination unit 70 is configured, for example, by a portion of the ECU related to the ADAS in the vehicle V, similar to the error quantity calculation unit 30, the correction quantity calculation unit 40, the distance correction unit 50, and the correction quantity update unit 60 described above. The determination unit 70 is configured to determine whether or not calculation of the error quantity ΔD by the error quantity calculation unit 30 is possible. Further, in the object detection device 100A for vehicle in the present embodiment, the error quantity calculation unit 30 is configured to calculate the error quantity ΔD based on the determination result of the determination unit 70.

More specifically, in the object detection device 100A for vehicle in the present embodiment, the determination unit 70 can be configured to determine that the calculation of the error quantity ΔD by the error quantity calculation unit 30 is possible, when any one or more of conditions (A) to (C) as follows are satisfied, for example.

The condition (A) is that the same object detected by the first detection unit 10 and the second detection unit 20 is in a predetermined error quantity calculation range R4 (see FIG. 2). When the condition (A) is satisfied, the object detection device 100A for vehicle in the present embodiment can be configured such that the determination unit 70 determines that calculation of the error quantity ΔD is possible. As the error quantity calculation range R4, for example, as indicated by dot-shaped hatching in FIG. 2, a region obtained by excluding a vicinity region R5 of the vehicle V from the overlapping region R3 in which the first detection range R1 and the second detection range R2 overlap each other can be exemplified. In the vicinity region R5 of the vehicle V, the detection accuracy of the distance of the object by the first detection unit 10 is decreased.

The condition (B) is that the environment around the vehicle V matches with a predetermined error calculation condition. When the condition (B) is satisfied, the object detection device 100A for vehicle in the present embodiment can be configured such that the determination unit 70 determines that calculation of the error quantity ΔD is possible. Examples of the error calculation conditions include (b1) no bad weather such as rainfall, snowfall, and heavy fog, (b2) nighttime, inside a tunnel, inside a building, backlight, and the like, that the illuminance conditions are not bad, (b3) a condition that the road conditions around the vehicle V, including the tunnel, are not conditions affecting the distance measurement principle of the first detection unit 10 and the second detection unit 20. Whether or not the error calculation condition is met is determined, for example, based on the image of the image capturing unit that constitutes the second detection unit 20, the operation state of the wiper, the determination of rainfall and snowfall by a raindrop sensor, the determination of a tunnel or a building by map information of a car navigation system, and the like.

The condition (C) is that the vehicle V is started and then stopped. When the condition (C) is satisfied, the object detection device 100A for vehicle in the present embodiment can be configured such that the determination unit 70 determines that calculation of the error quantity ΔD is possible. That is, only when the vehicle V is stopped immediately after being started, the determination unit 70 determines that the calculation of the error quantity ΔD is possible. Thus, the calculation of the error quantity ΔD by the error quantity calculation unit 30 and the calculation of the correction quantity $CA_f$ by the correction quantity calculation unit 40 are performed.

In addition, for example, the determination unit 70 can be configured to determine that the calculation of the error quantity ΔD by the error quantity calculation unit 30 is possible, when all conditions (D) to (G) as follows are satisfied.

The condition (D) is that, in the object detection device 100A for vehicle, the error quantity calculation unit 30 calculates a change amount of a parameter from an initial value of the parameter used for calculating the distances D1' and D2' of the object based on the image captured by the image capturing unit that constitutes the second detection unit 20, as the error quantity ΔD. Here, the position and the posture of the camera, which includes the base line length of the stereo camera (interval between the left and right cameras), the directions of the optical axes of the left and right cameras, the center positions of the lenses of the left and right cameras, and the like can be exemplified as the parameter of the image capturing unit constituting the second detection unit 20.

The condition (E) is that the object detection device 100A for vehicle includes the determination unit 70 that determines whether or not the calculation of the error quantity ΔD that is the change amount from the initial value of the parameter of the image capturing unit and is calculated by the error quantity calculation unit 30 is possible. The condition (F) is that the second detection unit 20 includes a self-correction unit 21 that corrects the parameter of the image capturing unit to reduce the error quantity ΔD that is the change amount from the initial value of the parameter of the image capturing unit. The condition (G) is that the self-correction unit 21 does not correct the parameter for a predetermined period. When all the above conditions (D) to (G) are satisfied, t determination unit 70 determines that the calculation of the error quantity ΔD is possible. The error quantity calculation unit 30 can be configured to determine the error quantity ΔD based on the determination result of the determination unit 70.

Figure 6:
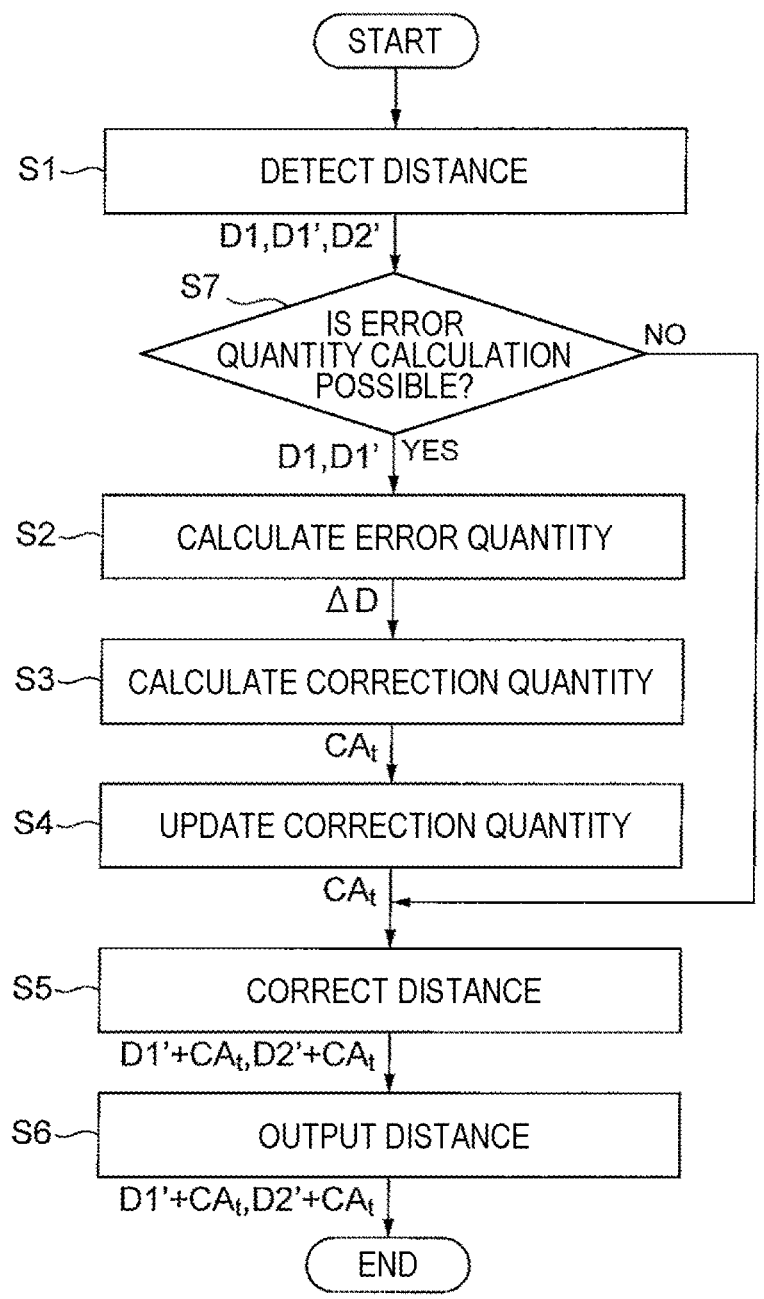
FIG. 6 is a flowchart illustrating an example of a process by the object detection device for vehicle illustrated in FIG. 5.

Next, an operation of the object detection device 100A for vehicle in the present embodiment will be described. FIG. 6 is a flowchart illustrating an example of a process of measuring the distance of an object by the object detection device 100A for vehicle in the present embodiment illustrated in FIG. 5. In the object detection device 100A for vehicle, processes from a distance detection process S1 to a distance output process S6 illustrated in FIG. 6 are repeatedly executed in a predetermined cycle, for example.

For example, as illustrated in FIG. 2, it is assumed that two other vehicles CV are in front of a vehicle V in which the object detection device 100A for vehicle is mounted. In such a circumstance, the object detection device 100A for vehicle firstly executes the distance detection process S1, similarly to the object detection device 100 for vehicle according to Embodiment 1 described above.

Then, the object detection device 100A for vehicle executes a determination process S7. In the determination process S7, the determination unit 70 determines whether or not the calculation of the error quantity ΔD by the error quantity calculation unit 30 is possible. More specifically, in the determination process S7, the determination unit 70 determines that the calculation of the error quantity ΔD by the error quantity calculation unit 30 is possible (YES), for example, when any one or more of the above conditions (A) to (C) are satisfied. Further, the determination unit 70 determines that the calculation of the error quantity ΔD by the error quantity calculation unit 30 is possible (YES), for example, when all of the above conditions (D) to (G) are satisfied.

If such determination is performed, the object detection device 100A for vehicle in the present embodiment performs the error quantity calculation process S2, the correction quantity calculation process S3, and the correction quantity update process S4 to calculate the error quantity ΔD and the correction quantity $CA_f$ and to update and store the correction quantity $CA_f$, similar to the object detection device 100 for vehicle according to Embodiment 1 described above. On the other hand, in the determination process S7, when all the above conditions (A) to (C) are not satisfied, or when any one or more of the above conditions (D) to (G) are not satisfied, the determination unit 70 determines that the calculation of the error quantity ΔD by the error quantity calculation unit 30 is not possible (NO).

If such determination is performed, the object detection device 100A for vehicle in the present embodiment does not execute the error quantity calculation process S2, the correction quantity calculation process S3, and the correction quantity update process S4. Thus, the correction quantity $CA_f$ stored in the correction quantity update unit 60 is maintained without being updated. Then, the object detection device 100A for vehicle executes the distance correction process S5 and the distance output process S6 based on the correction quantity $CA_f$ stored in the correction quantity update unit 60, similar to the object detection device 100 for vehicle according to Embodiment 1 described above.

As described above, the object detection device 100A for vehicle in the present embodiment includes the determination unit 70 that determines whether or not the calculation of the error quantity ΔD by the error quantity calculation unit 30 is possible. The error quantity calculation unit 30 is configured to calculate the error quantity ΔD based on the determination result of the determination unit 70. With this configuration, the correction quantity $CA_f$ is updated and stored only when the appropriate condition is satisfied. Thus, the update of the correction quantity $CA_f$ is prevented under the inappropriate condition, and it is possible to measure the distance more reliably and accurately by the second detection unit 20.

For example, in the object detection device 100A for vehicle, when the above condition (A) is satisfied, that is, when the same object detected by the first detection unit 10 and the second detection unit 20 is in the predetermined error quantity calculation range R4, the determination unit 70 determines that the calculation of the error quantity ΔD is possible. Thus, it is possible to correct the distance D1' of the same object detected by the second detection unit 20 based on the distance D1 of the object detected by the first detection unit 10.

Further, in the object detection device 100A for vehicle, for example, when the above condition (B) is satisfied, that is, when the environment around the vehicle matches with the predetermined error calculation condition, the determination unit 70 determines that the calculation of the error quantity ΔD is possible. Thus, the update of the correction quantity CA$_t$ is prevented in a state where the detection accuracy of the first detection unit 10 or the second detection unit 20 is reduced, and thus it is possible to measure the distance more reliably and accurately by the second detection unit 20.

In addition, in the object detection device 100A for vehicle, for example, when the above condition (C) is satisfied, that is, when the vehicle V is started and then stopped, the determination unit 70 determines that the calculation of the error quantity ΔD is possible. Thus, it is possible to update the correction quantity CA$_t$ only in a stopped state in which the detection is not affected by changes in the detection environment of the first detection unit 10 and the second detection unit 20 due to traveling of the vehicle V, and to measure the distance more reliably and accurately by the second detection unit 20.

Further, as described above, in the object detection device 100A for vehicle, when the conditions (D) to (G) as follows are satisfied, the determination unit 70 determines that the calculation of the error quantity ΔD by the error quantity calculation unit 30 is possible. (D) The error quantity calculation unit 30 calculates the change amount from the initial value of the parameter used for calculating the distance of the object based on the image captured by the image capturing unit constituting the second detection unit 20, as the error quantity ΔD. (E) The object detection device 100A for vehicle includes the determination unit 70 that determines whether or not the calculation of the error quantity ΔD is possible. (F) The second detection unit 20 includes the self-correction unit 21 that corrects the parameter of the image capturing unit to reduce the error quantity ΔD. (G) The self-correction unit 21 does not correct the parameter of the image capturing unit for a predetermined period.

Thus, for example, when the self-correction unit 21 in the second detection unit 20 performs self-correction of regularly correcting the parameter of the image capturing unit, that is, internal calibration after the elapse of the predetermined time, the correction quantity CA$_t$ is prevented from being excessive. Therefore, the distances D1' and D2' detected by the second detection unit 20 are prevented from being excessively corrected, and it is possible to accurately measure the distance of an object by the second detection unit 20. In addition, it is possible to accurately measure the distance of an object by the second detection unit 20 regardless of temporal changes of the image capturing unit constituting the second detection unit 20 or the mounting portion of the image capturing unit. The determination unit 70 can perform the determination of (G) above by receiving a signal transmitted when the self-correction unit 21 corrects the parameter of the image capturing unit.

Hitherto, the object detection device for vehicle according to the embodiments of the present disclosure has been described in detail above with reference to the drawings. The specific configuration is not limited to the above-described embodiments and the design changes and the like without departing from the gist of the present disclosure are included in the present disclosure.

REFERENCE SIGNS LIST

10 first detection unit
20 second detection unit
21 self-correction unit
30 error quantity calculation unit
40 correction quantity calculation unit
50 distance correction unit
60 correction quantity update unit
70 determination unit
100 object detection device for vehicle
100A object detection device for vehicle
CA$_t$ correction quantity
D1 distance
D1' distance
D2 distance
D2' distance
OV vehicle (object)
R1 first detection range
R2 second detection range
R4 error quantity calculation range
V vehicle
ΔD error quantity

The invention claimed is:

1. A object detection device for detecting a distance of an object around a vehicle, the device configured to:
    detect a first distance of an object in a first detection range;
    detect a second distance of the object in a second detection range including at least a portion of the first detection range, wherein accuracy of the first distance is higher than accuracy of the second distance;
    calculate an error quantity based on a comparison between the first and second distances of the object;
    calculate a correction quantity for correcting the second distance of the object based on the error quantity;
    correct the second distance of the object based on the correction quantity;
    store the correction quantity;
    update the correction quantity for each predetermined cycle by:
        calculating a difference between the correction quantity stored at a previous time and the correction quantity stored at a latest time,
        calculating the latest correction quantity by adding a value obtained by dividing the difference by an update gain that is 1 or more to the previous correction quantity, and
        storing the latest correction quantity, and
    correct the second distance of the object based on the stored latest correction quantity.

2. The object detection device according to claim 1, wherein the device is configured to calculate a ratio between the first and second distances of the object, as the error quantity.

3. The object detection device according to claim 1, wherein the device is configured to capture one or more images of the object and detect the first or second distance of the object based at least in part on the one or more images.

4. The object detection device according to claim 3, wherein the device is configured to calculate a change amount of a parameter from initial value of the parameter used for calculating the first or second distance of the object based on the one or more images.

5. The object detection device for vehicle according to claim 4, wherein the device is configured to:
- determine whether or not calculation of the error quantity is possible,
- correct the parameter to reduce the error quantity,
- determine that the calculation of the error quantity is possible, in response to a determination that the parameter has not been corrected for a predetermined period, and
- calculate the error quantity based on a determination that the calculation of the error quantity is possible.

6. The object detection device according to claim 1, wherein the device is configured to
- determine whether or not calculation of the error quantity is possible,
- calculate the error quantity based on a determination on whether or not the calculation of the error quantity is possible.

7. The object detection device according to claim 6, wherein the device is configured to, in response to a determination that the object is within a predetermined error quantity calculation range, determine that the calculation of the error quantity is possible.

8. The object detection device according to claim 6, wherein the device is configured to, in response to a determination that an environment around the vehicle matches with a predetermined error calculation condition, determine that the calculation of the error quantity is possible.

9. The object detection device according to claim 6, wherein the device is configured to, in response to a determination that the vehicle is started and then stopped, determine that the calculation of the error quantity is possible.

10. The object detection device according to claim 1, wherein the device is configured to
- store and update a plurality of the correction quantities depending on a position of the second detection range, and
- correct the second distance of the object based on the correction quantity depending on the position.

* * * * *